United States Patent
Götz et al.

(10) Patent No.: US 7,494,707 B2
(45) Date of Patent: Feb. 24, 2009

(54) HIGH-TACK ADHESIVE, METHOD OF ITS PREPARATION AND THE USE THEREOF

(75) Inventors: Kerstin Götz, Hamburg (DE); Thorsten Krawinkel, Hamburg (DE); Christian Ring, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 267 days.

(21) Appl. No.: 11/001,856

(22) Filed: Dec. 2, 2004

(65) Prior Publication Data

US 2005/0147813 A1 Jul. 7, 2005

(30) Foreign Application Priority Data

Dec. 5, 2003 (DE) ............... 103 57 321

(51) Int. Cl.
*B32B 7/12* (2006.01)
(52) U.S. Cl. ............... 428/355 EN; 428/355 R
(58) Field of Classification Search .......... 428/350, 428/355 R, 355 EN
See application file for complete search history.

(56) References Cited

U.S. PATENT DOCUMENTS

| | | | |
|---|---|---|---|
| 4,314,557 A | 2/1982 | Chandrasekaran | 128/260 |
| 4,318,953 A | 3/1982 | Smith et al. | 428/200 |
| 4,559,222 A | 12/1985 | Enscore et al. | 424/28 |
| 4,776,850 A | 10/1988 | Guse et al. | 604/304 |
| 4,855,335 A * | 8/1989 | Neperud | 523/111 |
| 5,120,546 A | 6/1992 | Hansen et al. | 424/449 |
| 5,686,179 A * | 11/1997 | Cotsakis et al. | 428/343 |
| 5,747,132 A | 5/1998 | Matsui et al. | 428/41.7 |
| 5,770,221 A * | 6/1998 | Nakamura et al. | 424/449 |
| 5,882,775 A | 3/1999 | Matsui et al. | 428/213 |
| 6,482,281 B1 | 11/2002 | Schmidt | 156/108 |
| 2003/0149383 A1 | 8/2003 | Ikeura et al | 602/8 |

FOREIGN PATENT DOCUMENTS

| | | |
|---|---|---|
| CN | 1334125 A * | 2/2002 |
| DE | 20 46 189 | 3/1972 |
| DE | 28 42 139 | 4/1979 |
| DE | 31 19 752 | 1/1982 |
| DE | 35 18 707 | 11/1986 |
| DE | 690 26 837 | 1/1997 |
| EP | 12 77 466 | 1/2003 |
| GB | 1349395 | 4/1974 |
| GB | 21 40 019 | 11/1984 |

* cited by examiner

*Primary Examiner*—Thao T. Tran
(74) *Attorney, Agent, or Firm*—Norris McLaughlin & Marcus PA

(57) ABSTRACT

Deviation ring for paste, comprising an annular rebound wall for a self-distributing centrifuge, positioned opposite the discharge slot of the centrifuge, the tangent of which is at an angle α of 3 to 60°, as seen over the entire opening width of the discharge slot.

5 Claims, 1 Drawing Sheet

HIGH-TACK ADHESIVE, METHOD OF ITS PREPARATION AND THE USE THEREOF

The present invention relates to an adhesive, to a method of preparing aforesaid adhesives by mixing, to an adhesive tape coated with the adhesive of the invention, and to the use of such an adhesive tape, specifically for the changeover, known per se, of flat web material wound onto reels, especially coated flat web material, such as, for example, coated papers, including PE-coated papers, or films.

BACKGROUND OF THE INVENTION

Many of the polymer surfaces stated or of the paper surfaces finished for particular gloss, such as are required, for example, for high-value printed products, have particularly smooth, low-absorbancy surfaces, with the consequence that adhesive bonds made to them can be unreliable, especially when the bonds are produced by applying limited pressure for only a very short time. But these are exactly the kind of adverse conditions affecting the flying splice connections that are required from time to time, where the pressure application time—the machines, of course, are not stopped but instead continue to run at full speed, which in papermaking can be up to 130 km/h (that is, around 36 metres per second)—is measured in only fractions of a millisecond and where the application pressure cannot be too high since otherwise the resistance of the reel to the press rolls would be too great and could cause tearing.

For the last-mentioned, very demanding utility a multiplicity of adhesive tapes with a very wide variety of adhesives have already been made available, the recommendation generally being for precise matching of the adhesive and the article to be bonded and in particular its surface material and surface roughness. Very generally, however, it may be stated that, in order to be suitable for the flying splice of polymeric films and coated papers, adhesives must have a high initial tack, in order to bond with sufficient reliability to the outgoing web at the prevailing speeds.

As well as the abovementioned applications in the papermaking and paper-converting industry, and also in the film-producing industry, which are of particular focus here, there are also, however, other applications for adhesives of high initial tack or tackiness, as for example for the sealing of certain forms of mass packaging. The flying splice technique is for the present-day adhesives industry comparable with what space travel was, 40 years ago, for mechanical engineering; consequently it seems appropriate not to restrict protection for the adhesives disclosed herein to the flying splice utility alone.

For a static splice (i.e. one performed at standstill) as well the adhesive bonding of particularly smooth papers, especially when they are coated, is difficult. Although in this case the pressure application time can be significantly longer, experience indicates that in many cases even this provides no further assistance.

For both flying and static splice it is common to use acrylate-based adhesives. These have the disadvantage, however, that they do not adhere, or adhere inadequately, to materials having a particularly smooth surface, such as PE-coated papers or gravure papers, for example, and the splice fails.

In order to allow a sufficient bonding with known adhesive tapes despite this, the conceptually most simple but economically often most painful measure is to enlarge the bond area. Another possibility is to use liquid adhesives rather than adhesive tapes. The inevitable corollary of using liquid adhesives, however, are the high personnel costs arising from lengthy manual operation, and solvent vapours, with all of their adverse consequences for the environment in general and one's own staff in particular.

The invention is based on the object of providing a high-tack adhesive. This adhesive should preferably provide such a large shear stability time that it is suitable even for producing adhesive splicing tapes that are able to compete—including not least on coated materials—with liquid adhesives without the need to go to extreme tape widths.

SUMMARY OF THE INVENTION

Starting from the conventional knowledge that in the development of adhesives the requirement for tackiness competes with the requirement for high cohesion, which is why for the particular application from the skilled adhesive worker seeks the most tolerable compromise between two competing requirements, and on the further knowledge that high tackiness tends to be achieved by low molecular weights whereas high cohesion tends to be achieved by high molecular weights, the inventors arrived at the finding that continuing the search, customary to date, for a molecular weight distribution whose cumulation point (i.e. absolute maximum) would lie between the position most favourable for high tackiness, on the one hand, and the position most favourable for high cohesion, on the other, would take them into a cul-de-sac. The inventors therefore arrived at the idea of proposing an adhesive that would have two distinctly separate relative maxima in the molecular weight distribution of the adhesive polymer.

The inventors additionally recognized that the modest adhesive results achieved hitherto might have something to do with the surface tension of acrylate-based adhesives and that a transition to other polymers, providing better wetting of the problematic surfaces, might be advantageous.

The inventors recognized, further, that polyisobutylene is able to offer better wetting properties than the acrylate adhesives which have prevailed to date. Up until the present time, however, polyisobutylene-based adhesives have always failed in the particularly demanding applications mentioned on account either of a lack of tack or of an insufficiently long stability time in the shear test. The inventors, however, ignored the last-mentioned ground for exclusion in their confidence—now confirmed—of escaping with sufficient distance from the drive towards the hitherto poor compromise between tack and cohesiveness by means of their innovative teaching, namely the production, rather than a middle maximum, of two distinctly separate relative maxima in the molecular weight distribution of the adhesive polymer.

DETAILED DESCRIPTION

After all these considerations the inventors arrived, finally, at the inventive teaching of an adhesive which is to comprise at least polyisobutylene and at least tackifying resin and which is characterized in that the molecular weight distribution—i.e. the plot of frequency over molecular weight—of the polyisobutylene has two relative maxima, specifically one between 40,000 g/mol and 200,000 g/mol and a second between $1.0 \times 10^6$ g/mol and $3.5 \times 10^6$ g/mol.

Adhesives of the invention feature significantly higher cohesiveness and hence higher stability time in the shear test on coated materials while at the same time having a sufficiently high tack that such an adhesive can be used, for example, for the flying splice of coated materials, and on such materials ultimately delivers sufficient bonding reliability.

In embodiments, an adhesive tape may be coated with the adhesive of the present invention on only one side. The adhesive tape may have a cleavable system on the side remote from the adhesive.

The polymer basis of the adhesive of the invention is polyisobutylene. In order to give the adhesive the required initial tack it is mixed with resins. The elastomer used is a mixture of a medium with a relatively high molecular mass polyisobutylene. The embodiment with the highest shear strength has been found so far, as elucidated further in the examples later on, to comprise, as the medium molecular weight polyisobutylene component, a grade having an average molecular weight of 40,000, which is freely available commercially under the name "Oppanol B10" from BASF, and, as the high molecular weight polyisobutylene component, a grade having an average molecular weight $M_w$ of 2,600,000, which is likewise freely available under the name "Oppanol B150". Products from the "Vistanex" family from Exxon are thought likely to have similar suitability. Resins used are rosins and/or polyterpene resins and/or other hydrocarbon resins.

For ease of reference we are using the codes E1 to E5 below for the various grades of polyisobutylene which will be investigated further; the key to these codes is as follows:

| Code: | Trade name: |
|---|---|
| E1: Polyisobutylene having an average* molecular weight of 40,000 | Oppanol B10 |
| E2: Polyisobutylene having an average* molecular weight of 85,000 | Oppanol B15 |
| E3: Polyisobutylene having an average* molecular weight of 200,000 | Oppanol B30 |
| E4: Polyisobutylene having an average* molecular weight of $1.1 \times 10^6$ | Oppanol B100 |
| E5: Polyisobutylene having an average* molecular weight of $2.6 \times 10^6$ | Oppanol B150 |

(*weight average molecular weight, g/mol)

Measurement of the Average Molecular Weight via Gelpermeationchromatography (GPC):

A solution of the sample in THF (tetrahydrofuran) is prepared, concentration: 3 g/l. After dissolving for 12 hours at room temperature the solution is filtered via a 1 μm one way filter. 200 ppm toluene are added, serving as internal standard.

A sample of 20 μl of this solution is analyzed by GPC (injected via auto sampler), using a sequence of four colums (first column: $10^3$, length: 50 mm; second: $10^6$; 300 mm; third: $10^4$, 300 mm; fourth: $10^3$, 300 mm; eluent: THF, flow rate: 1.0 ml/min). The calibration of the columns is effected by polystyrene standards; the detection is effected by measuring the changing of the refraction index via differential refractometer; type Shodex RI 71.

The particularly important feature of the invention, the innovative molecular weight distribution within the polyisobutylene component, is shown by FIG. 1 for an exemplary embodiment which has since been found particularly appropriate.

By a "molecular weight distribution" (or, more correctly, a "molar mass distribution") is meant a diagram in which on the vertical axis the frequency W of the molar mass M is plotted on a linear scale and on the horizontal axis the corresponding molar mass is plotted in g/mol, normally on a logarithmic scale.

BRIEF DESCRIPTION OF THE DRAWINGS

FIG. 1 shows the molecular weight distribution of an elastomer mixture without resin, consisting of 83 percent by weight of polyisobutylene having a molecular weight of 85,000 ("E2") and 17 percent by weight of polyisobutylene having a molecular weight of 2,600,000 ("E5"). In this molecular weight distribution the ordinate of the relative maximum lying between the molar weights of $1.0 \times 10^6$ g/mol and $3.5 \times 10^6$ g/mol is 0.24, while the ordinate of the other relative maximum is at 1.07. In accordance with claim 2 the smaller maximum should amount at most to 25% of the larger maximum. In accordance with claim 3 the relative minimum between the two maxima assigned to the polyisobutylene should amount to not more than 60% of the smaller of the two adjacent maxima, as can be seen here.

FIG. 2 shows the molecular weight distribution of a resin-containing adhesive whose elastomer composition corresponds to that shown in FIG. 1. This adhesive contains 60 percent by weight of the aforementioned mixture of two polyisobutylene grades and 40 percent by weight of resins, consisting in turn of 25 percent of a rosin (also called "H5" hereinafter) and 75 percent of an aliphatic hydrocarbon resin (also called "H2" hereinbelow). The plot shows, in the low molecular mass region, the resin fraction and, in the medium and high molecular mass region, the two relative maxima of the two polyisobutylene grades as already shown in FIG. 1.

Figure 1:
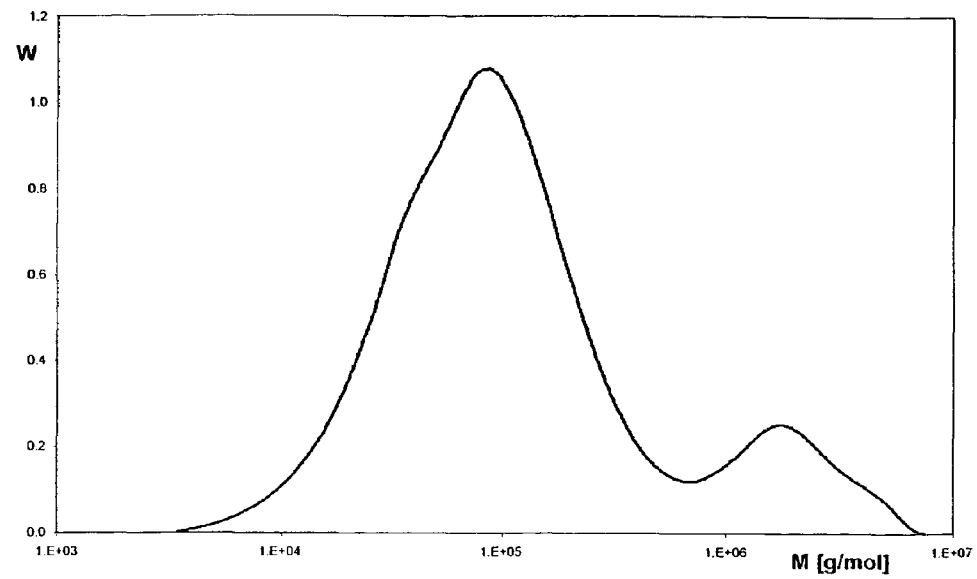
FIG. 1 is a graph of the molecular weight distribution of an elastomer mixture of the present invention, without resin.
Figure 2:
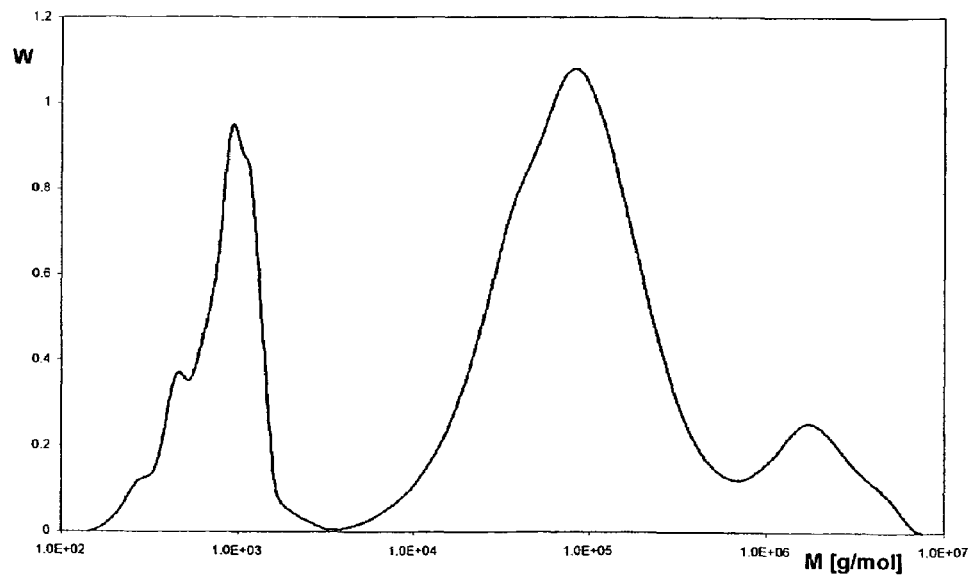
FIG. 2 is a graph of the molecular weight destribution of an elastomer mixture of the present invention, with resin.

The invention is elucidated below with reference to a number of examples:

Mixtures in accordance with the following formulas displayed the bond strengths and tack values listed in Table 1. The bond strength and the tack were determined on single-sided adhesive tapes where the adhesive in question had been coated at a coatweight of 70 g/m² on a paper backing. The bond strength was determined on coated gravure paper (type "Valsalux", 54.0 g/m²) from Norske Skog in a tensile testing machine at a peel angle of 180° and a peel speed of 300 mm/min.

The tack was determined in accordance with the rolling ball method, in which a steel ball with a diameter of 11 mm rolls from a ramp 65 mm high onto the adhesive side of the adhesive tape. The distance travelled is a measure of the initial tack: the lower the distance, the greater the tack.

The table below indicates the composition of the example formulas in percent by weight:

TABLE 1

| No. | Elastomer [%] | Resin [%] | Bond strength/paper [N/cm] | Tack [mm] |
|---|---|---|---|---|
| 1 | 50 | 20 H1, 30 H2 | 9.5 | 144 |
| 2 | 50 | 20 H3, 30 H2 | 10.6 | 170 |
| 3 | 50 | 20 H4, 30 H2 | 8.6 | >220 |
| 4 | 50 | 20 H5, 30 H2 | 11.0 | 105 |
| 5 | 50 | 20 H6, 30 H7 | 10.7 | 200 |
| 6 | 50 | 20 H6, 30 H8 | 9.8 | 91 |
| 7 | 50 | 20 H6, 30 H9 | 10.5 | 145 |

The elastomer used comprises a mixture of 80% of PIB (polyisobutylene) having a molecular weight of 40,000 and 20% of a PIB having a molecular weight of 1,100,000. The resins used are the following grades:

H1: hydrogenated hydrocarbon resin having a softening point of 88° C., available under the trade name "Regalite" from Eastman.
H2: aliphatic hydrocarbon resin having a softening point of 10° C., available under the trade name Wingtack from Goodyear.
H3: rosin, partially hydrogenated, pentaerythrityl ester, softening point at 101° C., available under the name "Pentalyn" from Eastman.
H4: polyterpene resin (α-pinene), softening point 25° C., available under the name "Piccolyte" from Eastman.
H5: rosin, hydrogenated, pentaerythrityl ester
H6: rosin, partially hydrogenated, pentaerythrityl ester (softening point 103° C.)
H7: rosin, partially hydrogenated, triethylene glycol ester
H8: rosin, hydroabietyl alcohol
H9: polyterpene resin, (β-pinene).

These mixtures all exhibit high bond strengths on the coated test substrate but apart from sample 6 do not possess outstanding tack, particularly not at relatively high speeds. Despite their suitability for an adhesive tape used for the flying splice, which is already better than in the prior art, further improvements in this respect appear desirable.

Although it is now not per se unusual to teach addition of a plasticizer in such a situation, any such addition is normally accompanied by a deterioration in the cohesion and hence in the shear stability time (often referred to in the jargon of the art, somewhat incorrectly, as "shear strength") to a greater extent than the improvement in tack. Highly complex plasticizer products have already been tried out with the aim of resolving this conflict. In connection with the inventively different nature of the two polyisobutylene grades, however, the inventors have now found that simple mineral oil, white oil for example, is enough to bring about an enormous improvement in the tack. The inventors' explanation of this is that the plasticizing oil promotes above all the gliding of the relatively short-chain polyisobutylene molecules over one another, these molecules in any case contributing less to the cohesiveness than the longer-chain polyisobutylene molecules. This progressive conflict resolution in plasticizer selection and plasticizer metering in fact occurs only when the molar mass distribution of the polymer features two relative maxima situated wide apart. Between the average molar masses of the two maxima there should preferably be a factor of 50 or more.

In order to study the oil effect altered by the invention, namely the more differentiated effect on the tack through reduced influencing of the shear stability time, mixtures in accordance with the formulas below were investigated for bond strength and tack. The elastomer used was the mixture of two different PIB products already mentioned in Table 1.

TABLE 2

| No. | Elastomer [%] | Resin [%] | Oil [%] | Bond strength/paper [N/cm] | Tack [mm] |
|---|---|---|---|---|---|
| 8 | 50 | 45 (H9 + H2) | 5 | 12.3 | 39 |
| 9 | 50 | 35 (H9 + H2) | 15 | 13.9 | 12 |
| 10 | 50 | 45 (H8 + H6) | 5 | 11.9 | 42 |
| 11 | 50 | 35 (H8 + H6) | 15 | 14.0 | 14 |

Table 3 below discloses mixtures containing mineral oil with varying polyisobutylene fractions. In this case "the polyisobutylene" was again—as in Table 1—a mixture of two polyisobutylene grades, namely one consisting of 80% of polyisobutylene having a molecular weight of 40,000 and 20% of a polyisobutylene having a molecular weight of 1,100,000.

The highest tested polymer (mixture) content, of 60%, showed the highest bond strength, in conjunction with very good tack.

TABLE 3

Any "%" in this specification refers to a percentage by weight

| No. | Elastomer [%] | Resin [%] | Oil [%] | Bond strength/paper [N/cm] | Tack [mm] | Shear stability time [min] |
|---|---|---|---|---|---|---|
| 12 | 40 | 50 | 10 | 12.6 | 15 | <2 |
| 13 | 45 | 45 | 10 | 12.6 | 15 | <2 |
| 14 | 55 | 35 | 10 | 13.7 | 17 | <2 |
| 15 | 60 | 30 | 10 | 13.8 | 16 | <2 |

On polyethylene-coated materials and polyethylene alone, as well, the bond strengths for the adhesive tapes used were very high, namely above 10.0 N/cm.

Table 3 also shows, however, that the shear stability time of aforementioned formulas is still not sufficient for those applications where a high shear strength is advantageous—as for example after flying splice in a gravure machine, where the web tensions are up to 1000 N/m.

For the static measurement of the shear stability time, tests were conducted on strips measuring 20 mm×13 mm with single-side (60 g/m$^2$) application of adhesive on coated gravure paper from StoraEnso of NeoPress rotogravure type, 54 g/m$^2$ LWC paper. The test specimen prepared was overrolled with a weight of 2 kg at a speed of 0.03 m/min 4 times and loaded for shearing. The result reported is the time taken for the adhesive tape to shear from the test substrate, in minutes. The results listed in Table 4 were obtained with the specimens loaded by 5N under standard conditions (23° C. and 50% relative atmospheric humidity).

Adhesive tapes coated with adhesives of such formulas can shear from the bond substrate at relatively high tensile loads, owing to their low cohesion, in the course of application and so can lead to tearing of the splice.

The invention is also intended, therefore, to provide an adhesive which is sufficiently cohesive without deterioration in tack. Use was therefore made of other polyisobutylenes, of higher molecular weight, for which the molecular weight (weight average, $M_w$) ranges from 40,000 up to 2,600,000 g/mol. The table below contains the formulas in percent by weight:

TABLE 4

| Number | Elastomer | Resin | Oil |
|---|---|---|---|
| 16 | 30 E 1 + 30 E 4 | 30 | 10 |
| 17 | 50 E 1 + 10 E 4 | 30 | 10 |
| 18 | 25 E 1 + 35 E 5 | 30 | 10 |
| 19 | 50 E 1 + 20 E 5 | 20 | 10 |
| 20 | 40 E 2 + 20 E 4 | 30 | 10 |
| 21 | 40 E 2 + 15 E 5 | 30 | 15 |
| 22 | 40 E 2 + 20 E 4 | 30 | 10 |
| 23 | 50 E 2 + 10 E 5 | 30 | 10 |
| 24 | 45 E 3 + 15 E 4 | 30 | 10 |
| 25 | 40 E 3 + 20 E 5 | 30 | 10 |
| 26 | 50 E 3 + 10 E 5 | 30 | 10 |

In comparison to the formulas of Table 3, these mixtures give rise to very high shear values without significant deterioration in bond strength and tack. The results are shown in Table 5.

Once again, single-sided specimens with a coat weight of 60 g/m² were subjected to measurement, with the shear strength being determined at room temperature under standard conditions and a load of 5 N on the aforementioned gravure paper.

TABLE 5

| Number | Bond strength [N/cm] | Tack [mm] | Shear stability time [min] |
|---|---|---|---|
| 16 | 5.4 | 28 | 13 |
| 17 | 8.5 | 35 | 3 |
| 18 | 4.5 | 49 | 213 |
| 19 | 6.5 | 39 | 65 |
| 20 | 7.5 | 25 | 18 |
| 21 | 9.7 | 8 | 16 |
| 22 | 7.2 | 18 | 87 |
| 23 | 11.2 | 18 | 19 |
| 24 | 6.9 | 36 | 40 |
| 25 | 6.8 | 16 | 139 |
| 26 | 8.2 | 14 | 71 |

The results in Table 5 show that the shear strength can be set very effectively by way of the choice and amount of the polyisobutylene grades; the desired adhesive can be adjusted from having virtually no shear strength at all (number 17) up to a high shear strength (number 18). Adding the oil retains the high initial tack needed for flying splice.

In the following example a comparison was made between two adhesive tapes with adhesives of the invention, namely one (1) with formula 15 from Table 3 and one (2) with formula 23 from Table 4, and also with a commercially available adhesive tape (3), namely tesa EasySplice PrintLine (the side tested being specifically the splice-forming side, which prior to preparation of the splice is still lined with release paper). Measurements were made of the bond strengths on polyethylene sheets and on polyethylene-coated card. All three adhesive tapes were in the form of single-sidedly adhesive specimens with a coat weight of 50 g/m²:

TABLE 6

| | Bond strength/ PE sheet | Bond strength/PE-coated card | Bond strength/ gravure paper |
|---|---|---|---|
| Adhesive tape 1 | 13.1 | 12.6 | 13.8 |
| Adhesive tape 2 | 11.4 | 10.8 | 11.2 |
| Adhesive tape 3 | 1.8 | 1.6 | 3.7 |

Starting from an adhesive comprising at least polyisobutylene and at least one tackifying resin the invention proposes in summary a high-tack adhesive, preferably having particular suitability for use on adhesive splicing tapes which are able to compete—including not least on coated materials—with liquid adhesives, whereby c) the molecular weight distribution of the polyisobutylene features two relative maxima, specifically
d) one between 50,000 and 200,000 and
e) a second between $1.0 \times 10^6$ and $3.5 \times 10^6$.

Preferably both of the said maxima are separated by a minimum of not more than 60% of the height of the smaller of the two adjacent maxima, and, in the molecular weight distribution, the ordinate of the relative maximum which lies between $1.0 \times 10^6$ and $3.5 \times 10^6$ amounts to not more than 25% of the ordinate of the relative maximum which lies between 50,000 and 200,000.

We claim:

1. A splicing tape for flying splice for joining the end of an old, outgoing reel to the start of a new reel to be introduced to replace it, said splicing tape having an adhesive coated on only one side of a backing, said adhesive comprising at least
   a) from 40-70 percent by weight of polyisobutylene and
   b) from 30-50 percent by weight of at least one tackifying resin,
   wherein
   c) the molecular weight distribution, defined as the plot of frequency over the molecular weight of the polyisobutylene features two relative maxima,
   d) one relative maxima between a weight average molecular weight $M_w$ of 40,000 g/mol and a weight average molecular weight $M_w$ of 200,000 g/mol and
   e) a second relative maxima between a weight average molecular weight $M_w$ of $1.0 \times 10^6$ g/mol and a weight average molecular weight $M_w$ of $3.5 \times 10^6$ g/mol,
   and said splicing tape having a cleavable system on a side of the backing opposite the adhesive.

2. Splicing tape according to claim 1, wherein in the molecular weight distribution the ordinate of the relative maxima which lies between $1.0 \times 10^6$ g/mol and $3.5 \times 10^6$ g/mol amounts to not more than 25% of the ordinate of the relative maxima which lies between 50,000 g/mol and 200,000 g/mol.

3. Splicing tape according to claim 1, wherein the polyisobutylene it comprises features in its molecular weight distribution, between its two relative maxima, a relative minimum whose height (frequency) amounts to not more than 60% of the smaller of the two adjacent relative maxima.

4. Splicing tape according to claim 1, wherein between the abscissae (molecular weights) of the two relative maxima in the molecular weight distribution of the two polyisobutylene grades there is a factor of 50 or more.

5. Splicing tape according to claim 1, wherein the adhesive comprises
   a) from 40 to 70 percent by weight of polyisobutylene,
   b) from 25 to 40 percent by weight of a tackifying resin and
   c) from 5 to 20 percent by weight of mineral oil.

* * * * *